United States Patent
Dimock

(10) Patent No.: US 10,482,783 B2
(45) Date of Patent: Nov. 19, 2019

(54) ADAPTIVE ASSISTANCE FOR FLIGHT SIMULATION

(71) Applicant: FRASCA International Inc., Urbana, IL (US)

(72) Inventor: Glen Dimock, Savoy, IL (US)

(73) Assignee: Frasca International, Inc., Urbana, IL (US)

(*) Notice: Subject to any disclaimer, the term of this patent is extended or adjusted under 35 U.S.C. 154(b) by 137 days.

(21) Appl. No.: 15/339,231

(22) Filed: Oct. 31, 2016

(65) Prior Publication Data

US 2017/0243505 A1    Aug. 24, 2017

Related U.S. Application Data

(60) Provisional application No. 62/251,816, filed on Nov. 6, 2015.

(51) Int. Cl.
| | |
|---|---|
| *G09B 9/14* | (2006.01) |
| *G09B 9/46* | (2006.01) |
| *G09B 9/24* | (2006.01) |
| *G09B 9/12* | (2006.01) |

(52) U.S. Cl.
CPC ............. *G09B 9/46* (2013.01); *G09B 9/12* (2013.01); *G09B 9/24* (2013.01)

(58) Field of Classification Search
CPC ... G09B 9/12; G09B 9/14; G09B 9/16; G09B 9/1656; G09B 9/20; G09B 9/28
See application file for complete search history.

(56) References Cited

U.S. PATENT DOCUMENTS

| | | | |
|---|---|---|---|
| 4,268,979 A * | 5/1981 | Minnich | G09B 9/14 327/552 |
| 4,298,833 A | 11/1981 | Edwards et al. | |
| 4,330,829 A | 5/1982 | Fischer et al. | |
| 5,935,177 A | 8/1999 | Cox et al. | |
| 6,199,028 B1 | 3/2001 | Repperger et al. | |
| 6,259,223 B1 | 7/2001 | Buck | |
| 7,225,061 B2 | 5/2007 | Raimbault et al. | |
| 7,272,473 B2 | 9/2007 | Hiltner et al. | |
| 7,976,310 B2 | 7/2011 | Bachelder et al. | |
| 7,996,120 B2 | 8/2011 | Delannoy | |
| 8,095,252 B2 | 1/2012 | Fabre | |
| 8,473,117 B1 | 6/2013 | McConville | |
| 8,473,121 B2 | 6/2013 | Raimbault et al. | |
| 2014/0157916 A1 * | 6/2014 | Vatcher | A63G 31/16 74/51 |
| 2014/0350750 A1 | 11/2014 | Burch et al. | |

OTHER PUBLICATIONS

D. T. McRuer, D. H. Klyde, and T.T. Myers, "*Development of a Comprehensive PIO Theory*", AIAA paper 96-3433 (1996), pp. 581-597.

L. Qingling, X.S. Tan, and M. Lone, "*Towards the design of a pilot-induced oscillation detection and mitigation scheme*", AIAA paper 2013-4605 (2013), 19 pages.

* cited by examiner

*Primary Examiner* — James S. McClellan
(74) *Attorney, Agent, or Firm* — Leydig, Voit & Mayer, Ltd.

(57) ABSTRACT

A simulator assistance method and system adaptively mitigates Pilot Induced Oscillations (PIOs) with respect to axes of rotation about the vehicle's center of mass. The method detects PIOs in a body rate signal by band pass filtering the body rate signal, and provides an adaptive response based on the amplitude of the body rate signal within the frequency band.

11 Claims, 12 Drawing Sheets

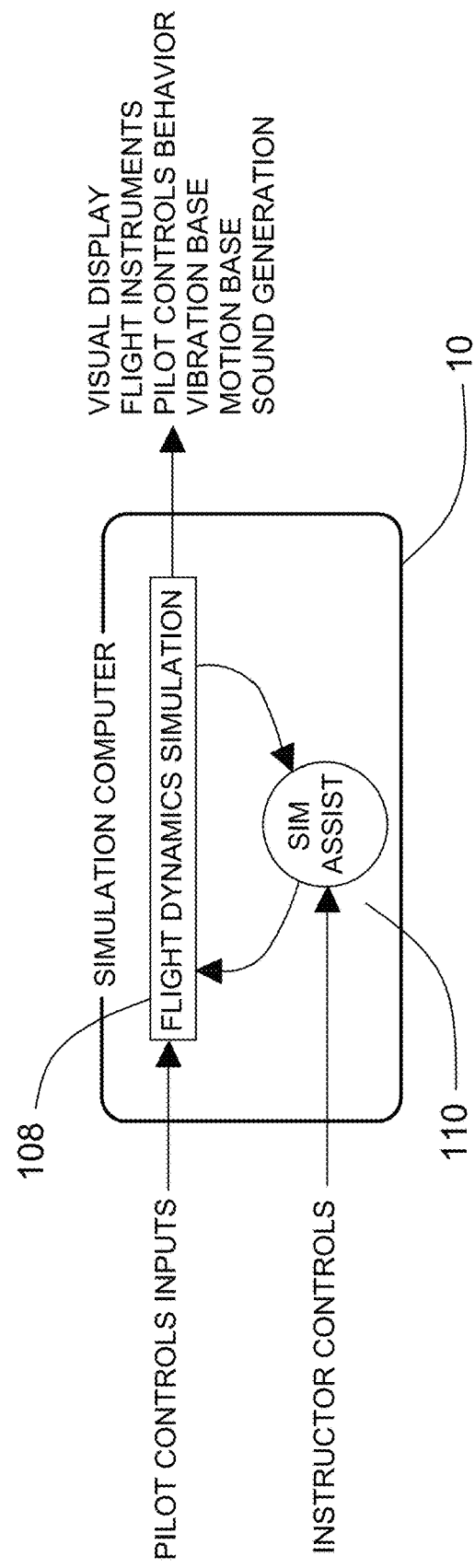

ADAPTIVE ASSISTANCE FOR FLIGHT SIMULATION

CROSS REFERENCE TO RELATED APPLICATIONS

This application claims the benefit of U.S. Application 62/251,816, filed on Nov. 6, 2015, the subject matter of which is incorporated herein by reference in its entirety.

FIELD OF THE INVENTION

The field of this invention generally relates to the flight simulator art, and more particularly, to adaptive control for flight simulation that provides a varying degree of pilot assistance depending on transport delays and incomplete sensory cues.

BACKGROUND

FIG. 1 illustrates, in a general sense, a pilot-aircraft control loop 10 having a coupling between an "objective" aircraft dynamics path 12 and a "subjective" pilot-in-the-loop perception and action path 14. As shown therein, manually controlling an aircraft (including rotorcraft) involves two chains of events, connected to each other as the pilot-aircraft loop 10. First, various flight control inputs, denoted by a block 16, are received by the aircraft. Such control inputs 16 affect aircraft dynamics, denoted by a block 18. These include mechanical linkages, eventual automation features (fly-by-wire), eventual actuators and boosters and the like. The aircraft response, denoted by a block 20, denotes control surfaces that aerodynamically create the aircraft response as a function of its inertia and other factors. These elements introduce some form of delay between pilot input and aircraft response.

The pilot-aircraft loop 10 may also be represented by various items in the pilot perception and action path 14. These may be quantified by the manner in which the pilot perceives the aircraft response through a set of parallel sensory inputs. As shown in FIG. 1, such sensory inputs include a perception of visual scenery, denoted by a block 22, for observation of visible scenery through cockpit windows, a visual scanning of flight instruments block 24, a tactile perception (buffeting, stick shaker/pusher) block 26, a proprioceptive perception (vibrations, seat-of-the-pants) block 28, a vestibular perception (linear and angular accelerations) 30, and an auditory perception (air rush, caution warnings) block 32. These parallel sensory perception inputs are fused as a pilot sensory fusion block 34 to represent a pilot reaction, denoted by a block 36. Such sensory perceptions tend to have different individual neurological delays, from milliseconds for auditory cues to hundreds of millisecond for visual cues. In the will to achieve a specific task, the pilot reacts to the fusion of the different inputs to act on the flight controls, thereby "closing the loop" of the pilot-aircraft system.

"Flight simulators" are also known in the art. A Flight Simulator can include various types of Flight Simulation Training Devices (FSTD), ranging from Full Flight Simulators (FFS) that provide a six-degree-of-freedom motion bases to fixed-base Flight Training Devices (FTD), Flight Navigation Procedures Trainers (FNPT), and lower-fidelity devices. Any of those may be equipped with a dedicated vibration system which adds high-frequency, low-amplitude motions to the simulated cockpit. In general, a flight simulator may complicate the above pilot-aircraft control loop in various ways.

First, time delays are introduced to perform the simulation computations and internal communication between the components used in the flight simulator, denoted in FIG. 1 as a block 38. Such delays are known as simulator "transport delay" or "latency" depending on the measurement methods. Such delays are added to the delays discussed above, and may differ among cueing channels. For example, the transport delay may range from 30 ms for fast responding flight simulators, to 300 ms for other more conventional flight training devices. Second, because sensory cues provided in a flight simulator are simulated, they represent reality only to a certain degree of fidelity, and in some cases, they may not be provided at all. For example, the visual cues provided to the pilot may have a fixed focal distance, pilot parallax, limited field of view, limited brightness, limited contrast, limited resolution, no stereoscopic depth cues, and imperfect scene rendition. Motion cues, if provided, have limited envelope and artifacts caused by re-centering, or "washing out", the position to account for envelope limitations.

In a typical closed-loop control system, such as a piloted aircraft, the introduction of delays decreases its stability margin. A typical example is Pilot Induced Oscillations (PIO), in which reaction delays of the pilot are identified as a factor in the aircraft becoming out of phase with the pilot's inputs. This is a significant problem that affects all kinds of aircraft, and for which detection and mitigation have been researched extensively, such as by way of example, described by L. Qingling et al., "*Towards the design of a pilot-induced oscillation detection and mitigation scheme,*" AIAA paper 2013-4605 (2013), the subject matter of which is incorporated herein by reference. The situation is often exacerbated in flight simulators, because of the existence of additional transport delays and the imperfect or insufficient sensory cues, even if the aircraft dynamics are perfectly modeled and simulated.

Even with high-fidelity flight dynamics and control loading models, coupled with a high-quality visual display system, a flight simulator with insufficient cues can be difficult to control even by experienced pilots. Additionally, some pilots experience "simulator sickness" as result of the modified cueing environment or PIOs. Eventually most pilots will adapt to the flight simulator with a modified control strategy, most notably with a reduction in control gain.

As applied to ab-initio helicopter flight training, a hovering maneuver is initially such a demanding and fundamental task that student pilots are rarely taught to do it in a flight simulator. Student pilots, if unchecked by the instructor, tend to over-control the cyclic, collective, and pedals to such a degree that the helicopter enters divergent oscillations which quickly end in a crash. This initial learning is generally performed in a real helicopter, thus increasing risk for student and instructor.

What is described for helicopter hovering is applicable to other flight maneuvers such as autorotation entry, autorotation descent, and autorotation landing. All of these tasks have increased risk in terms of flight training, which could be mitigated if trained in a flight simulator instead of the aircraft. Similar phenomena can be seen with respect fixed-wing aircraft. For example, one such maneuver involves correctly tracking the localizer and the glideslope during an instrument landing system approach.

SUMMARY

A general object of this disclosure is to assist pilots in mastering new airmanship skills when operating a flight simulator in order to reduce time to proficiency in those tasks.

In one aspect, a flight simulator operates in accordance with a flight simulation assistance method that adaptively mitigates Pilot Induced Oscillations (PIOs) with respect to angles of rotation about three axes of rotation, that is, about pitch, roll, and yaw axes. The method first monitors a simulated aircraft body rate signal with respect to the axes of rotation and performs frequency decompositing of the simulated aircraft body rate signal. Next, the method bandpass filters the body rate signal to provide a filtered body rate signal within a preselected frequency band. The method calculates a gain coefficient as a function of the amplitude of the filtered body rate signal, and applies an artificial aircraft body rate damping coefficient in proportion to the calculated gain coefficient to reduce the filtered body rate signal.

In another aspect, a flight simulation training device for emulating an aircraft that is performing a specific maneuver includes input controls, such as a cyclic and pedals, which receive pilot input during the specific maneuver. A simulation assistance system, which is a part of the flight training device, compares an actual trajectory of the simulated aircraft based on the input controls to an ideal trajectory for the specific maneuver, and determines a deviation therebetween. From a deviation history, the simulation assistance system calculates a gain coefficient as a function of the amplitude of the deviation history. The calculated gain coefficient is used to generate a nudging force of a preselected amplitude and phase to emulate a corrective action of a flight instructor and to reduce the deviation from the ideal trajectory.

BRIEF DESCRIPTION OF THE DRAWINGS

FIG. 4 is a block diagram representation of a simulation assistance system in an embodiment of the disclosure.

DESCRIPTION OF THE PREFERRED EMBODIMENTS

This disclosure generally relates to a simulator assistance method and system, known as "SimAssist," to assist student pilots in acquiring improved airmanship skills when operating a flight simulator, and to assist experienced pilots when adapting to a flight simulator. In one aspect, a flight simulation assistance method operates in conjunction with a flight simulator by adaptively mitigating Pilot Induced Oscillations (PIOs) with respect to axes of rotation in three-dimensions about the center of mass of a vehicle, which in this case is an aircraft. The method detects PIOs in which pilot reaction delays are identified as a factor in the aircraft tending to become out of phase with the pilot's inputs during the performance of a particular task. The method detects oscillations of the body rate in a particular band corresponding to such PIOs, and provides an adaptive response to the simulator. Such adaptive response reduces time to proficiency in those tasks.

Figure 2:
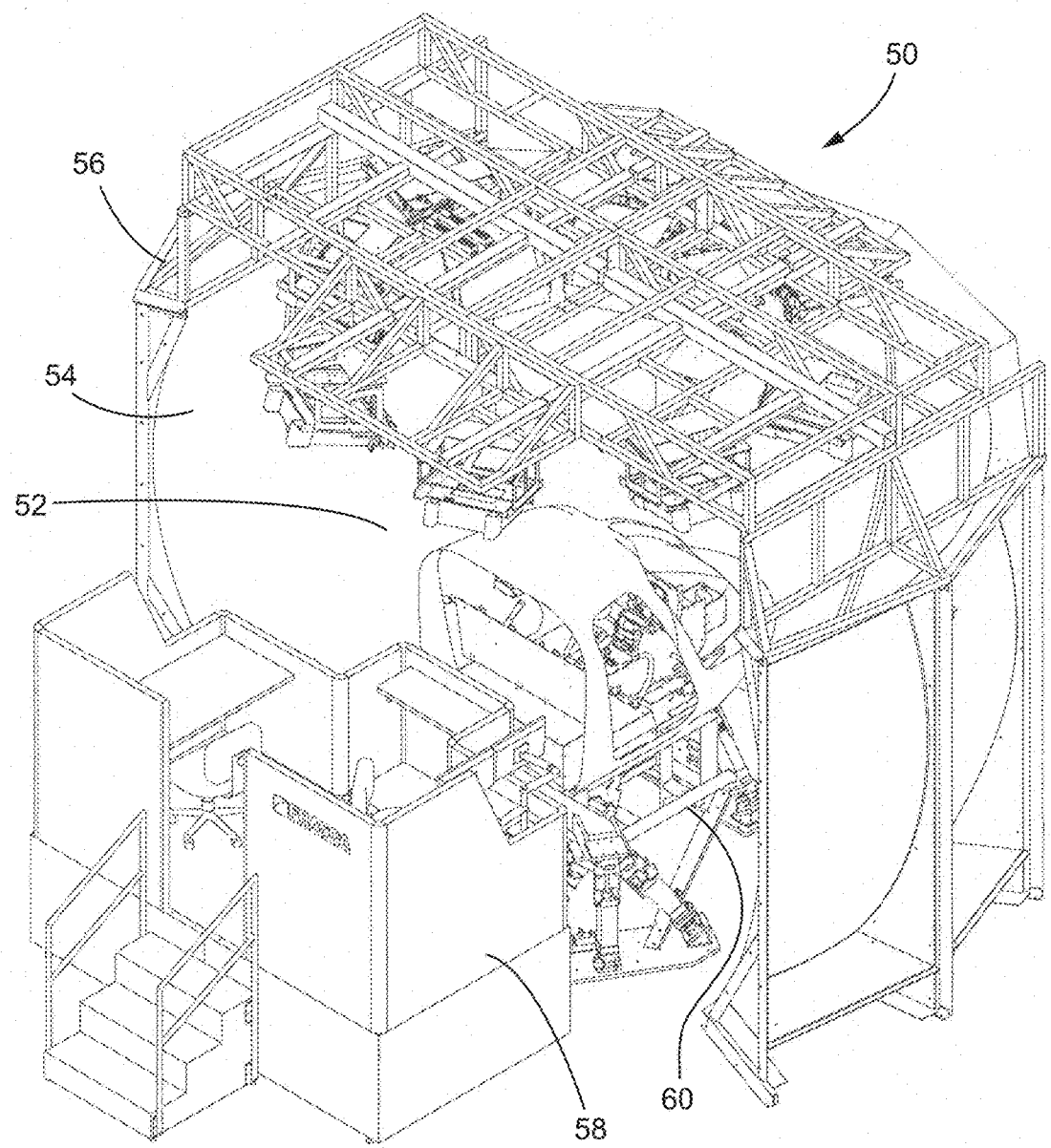
FIG. 2 illustrates an exemplary environment in which the disclosure may be deployed.

FIG. 2 illustrates an exemplary Flight Simulation Training Device (FSTD), which in this case is a Full Flight Simulator (FFS), denoted by the numeral 50. The FFS 50 includes a fully functioning simulated cockpit 52. As explained in greater detail below, the cockpit 52 is equipped with the flight instrumentation and controls for an actual cockpit of a rotary wing aircraft, and in an embodiment, the cockpit 52 faithfully reproduces the look-and-feel of an actual cockpit for the rotary wing aircraft. The cockpit is at least partially surrounded by an enclosure 54, which in turn supports an external frame 56 for projectors. The enclosure 54 provides a projection surface on which visual simulation of a training exercise may be provided, as will be understood by those skilled in the art. In an embodiment, visual simulation is provided in a greater than 180-degree field of view. A platform 58, disposed rearward of the cockpit 52, allows an instructor and other personnel to view the simulation and training.

The cockpit 52, in turn, itself is supported by a support frame 60 on which various actuators are disposed, as will be understood by those skilled in the art. The actuators operate to move the cockpit 52 about three axes of rotation about the center of mass of the simulated aircraft, a roll axis, a pitch axis, and a yaw axis, and to translate the cockpit along these same axes.

Figure 3:
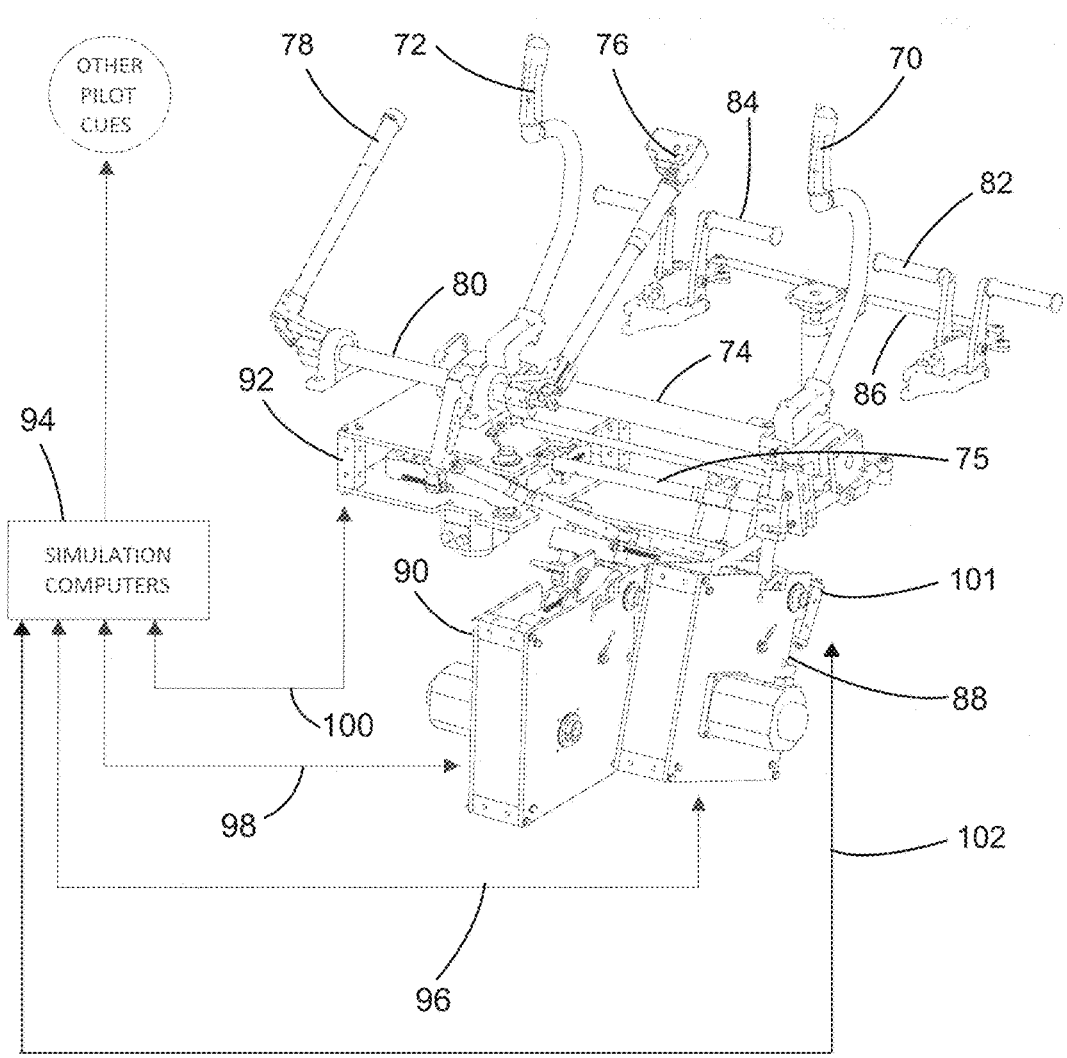
FIG. 3 is a diagrammatic representation of a flight simulator in which the disclosure may be utilized.

FIG. 3 is a diagrammatic representation of various input devices that are accessible by a student pilot and a trainer in the flight simulator 50. In this embodiment, the cockpit 52 comprises various controls for maneuvering the rotary wing aircraft. Such controls include first and second cyclics or sticks 70 and 72, coupled together through linkages 74 and 75, which are used to change pitch and bank attitude via the main rotor during the simulation. In addition, first and second collective controls 76 and 78, coupled through a linkage 80, are used to change the pitch of the main rotor to change the thrust of the rotary wing aircraft during the simulation. The cockpit 52 also comprises pairs of first and second yaw pedals 82 and 84, coupled by a linkage 86, that are used to change the pitch of the tail rotor.

These manual input controls are coupled, via the linkages 74, 75, 80 and 86 to respective control loading actuators 88, 90, 92 and 101. The actuators 88, 90, 92 and 101 also detect pilot inputs via strain gauges and convert the received input into a plurality of digital signals, which are provided to simulation computers denoted by block 94 via respective communication channels schematically shown by the lines 96, 98, 100 and 102, as will be understood by those skilled in the art. As explained in greater detail below, the actuators 88, 90, 92 and 101 operate to provide manual feedback such as resistance to control movement as a function of simulation computer commands that are provided from the simulation computers 94 to the actuators via the communication channels 96, 98, 100 and 102.

In response to the input received from the pilot and trainer control inputs, the simulation computer 94 operates in a logical fashion to control various aspects of the flight simulator. For example, the simulation computer 94 controls the actuators attached to the supporting frame 60 (see FIG. 2) to provide coordinated movement to the cockpit 52 in accordance with the simulated flight of the rotary wing aircraft. In addition, the simulation computer 94 builds the scenery with respect to a video display for the simulator 50. The simulation computer 94 continuously updates the flight instrumentation panels in the cockpit 52, as well as controls audio supplied to appropriate equipment for generation of sound.

FIG. 4 is a block diagram representation of an embodiment of the disclosure. As shown therein, the simulation computer 94 contains a main flight dynamics simulation process or processes 108 as will be understood by those skilled in the art. In addition, the simulation computer 94 contains a simulation assistance system 110, which may be implemented as "SimAssist" application software that is executed by the simulation computer 94 in conjunction with the flight dynamics simulation process 108. Various pilot control inputs, such as the signals provided by the actuators 88, 90, 92 and 101 are provided to the flight dynamics simulation software. In addition, the flight dynamics simulation software is executed to provide various output signals for controlling the flight simulator, as explained above in connection with FIG. 3. These include control of the visual display, flight instrumentation, pilot controls behavior, and vibration, motion and sound. Based on the pilot control inputs and the instructor inputs, the simulation assistance system 110 provides adaptive mitigation strategies to selectively correct Pilot Induced Oscillations (PIOs), as explained below.

In a preferred embodiment, the simulation assistance software and system 110 detect and mitigate Pilot Induced Oscillations (PIOs) in the flight simulator 50. The simulation assistance system comprises a real-time control loop that performs the following:

a. Detects simulator-specific Pilot Induced Oscillations (PIOs);
b. Computes an Adaptive Gain which is used to scale mitigation strategies; and
c. Applies mitigation strategies to the flight dynamics simulation software.

In this case, detection of Category I Pilot Induced Oscillations can be viewed as those PIOs introduced by the imperfect cueing environment of a simulator, or simulator-specific PIOs. For actual aircraft, "Category I PIOs" can be viewed as oscillations resulting from lags caused by filters, actuators, feel system and digital time delays, as introduced by McRuer (1995) *"Pilot-Induced Oscillations and Human Dynamic Behavior"*, NASA Contractor Report 4683, the subject matter of which is incorporated herein by reference. The same type of PIOs may be also introduced in flight simulators due to delayed cues resulting from transport delays or the like introduced by the simulation, and/or simulator missing cues such as, for example, lack of motion as compared with actual flight. Missing motion cues may be treated as a type of lag, as the brain is forced to rely on other cues (visual) which are known to require additional processing time. Category I PIOs therefore tend to be more likely to occur in a simulator than in a real aircraft.

Category I PIOs are typically associated with a specific frequency range for a given maneuver. By way of example, for a light helicopter in hover, such PIOs typically occur in a frequency range between 0.3 and 0.7 Hz. Those numerical values are typical for light helicopter hovering, and would be different for other helicopters and other tasks. They are in line with the crossover frequencies of 0.37 Hz (2.3 rad/s) for acceleration commands and 0.65 Hz (4.1 rad/s) for rate commands of the idealized aircraft described in Table 2 (p. 27) of McRuer (1995). Light helicopter dynamics tend to fall somewhere in between acceleration and rate-command, depending on the rotor configuration and installed stability augmentation systems. In an embodiment, the step of detecting PIOs occurs continuously. On the other hand, the steps of computing an adaptive gain and applying a mitigation strategy are selectively activated and adjusted by user selection at the Instructor Operator Station (IOS). While mitigating detected PIOs are described herein for commonality and clarity, this disclosure may be applied to detection of other tasks conducted by the pilot as well.

Figure 5A:
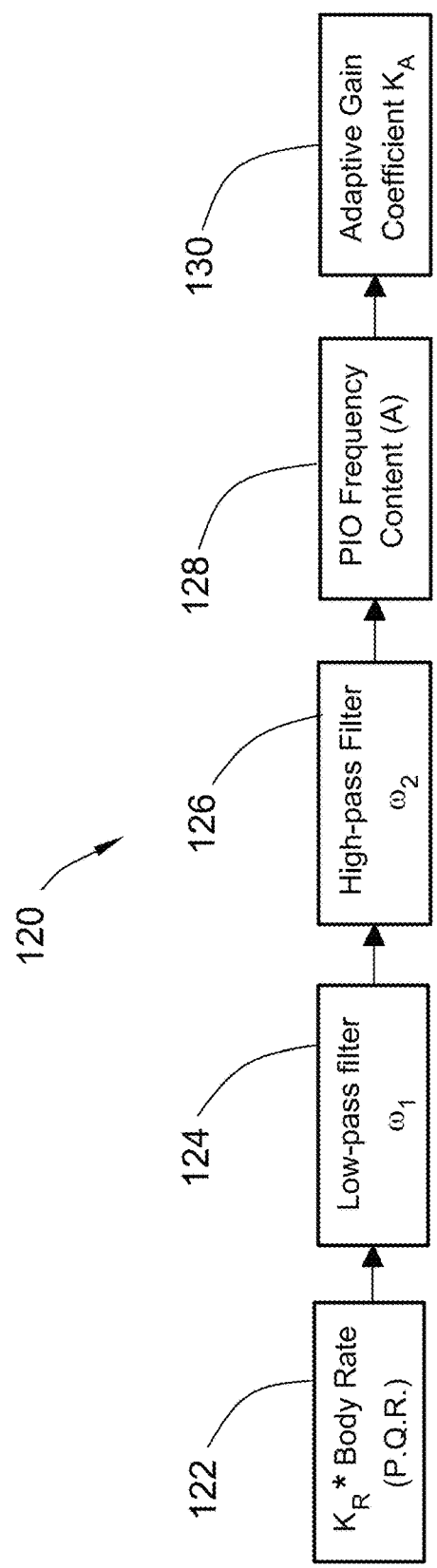
FIG. 5A shows an identification of Pilot Induced Oscillations (PIO) content within a selected frequency band performed by the simulation assistance system.

As shown in FIG. 5A, the simulation assistance system 110 operates in accordance with a detection algorithm 120 for detecting and band-pass filtering an aircraft body rate signal and determining an adaptive gain coefficient, $K_A$. Specifically, the detection algorithm 120 separately detects an aircraft body rate with respect to its three-dimensional axes of rotation about the center of mass of aircraft body to yield a real-time amplitude of body rate content. The content of the detected aircraft body rate response is shown as a body rate gain coefficient, $K_R$ with respect to a particular axis of rotation, in a block 122. The detected body rate content is thereafter passed through a low-pass filter 124 having a cut-off frequency $\omega_1$, which in a preferred embodiment is approximately 0.7 Hz. Next, the detected body rate is passed through a high-pass filter 126, having a cut-off frequency of approximately 0.3 Hz. These steps are repeated for each axis of rotation for the vehicle. In this way, detection algorithm 120 determines an amplitude A of the main frequency content of the PIO the within the determined PIO frequency range ($\omega_1$ to $\omega_2$), as shown in FIG. 5A by a block 128.

Other approaches known in the prior art typically involve a comparison between pilot input and vehicle response in order to detect phase delay. In the described embodiment, the detection algorithm 120 ignores phase delay. While this implementation may be more vulnerable to false detection of open-loop responses within a particular frequency range from sources such as atmospheric turbulence or natural modes of the vehicle, in practice it has no adverse consequences on the mitigation.

In accordance with the disclosure, an adaptive gain resulting from the detected PIO frequency term, A, is next computed as illustrated by a block 130 in FIG. 5A. Because the real-time PIO frequency term, A, tends to be noisy, it is smoothed before it is used for PIO mitigation. A resulting adaptive gain coefficient, $K_A$, can then be applied to perform mitigation techniques, as described below. The adaptive gain coefficient, $K_A$, is computed by integrating the detected PIO frequency term, A, over time, subject to limit and washout constants. These constants are introduced to bring the integral term to zero when PIOs are not detected. Note that the positive rate of integration during PIO is affected by the body rate gain $K_R$, above.

$$K_A = \max(\min(\int \max(|A| - W_r - W_{min}) dt, K_{max}), K_{min})$$

where:

W=Washout constant, to drive the integral to zero over time $W_{min}$=Washout rate limit, to control how quickly the washout can occur.

Figure 5B:
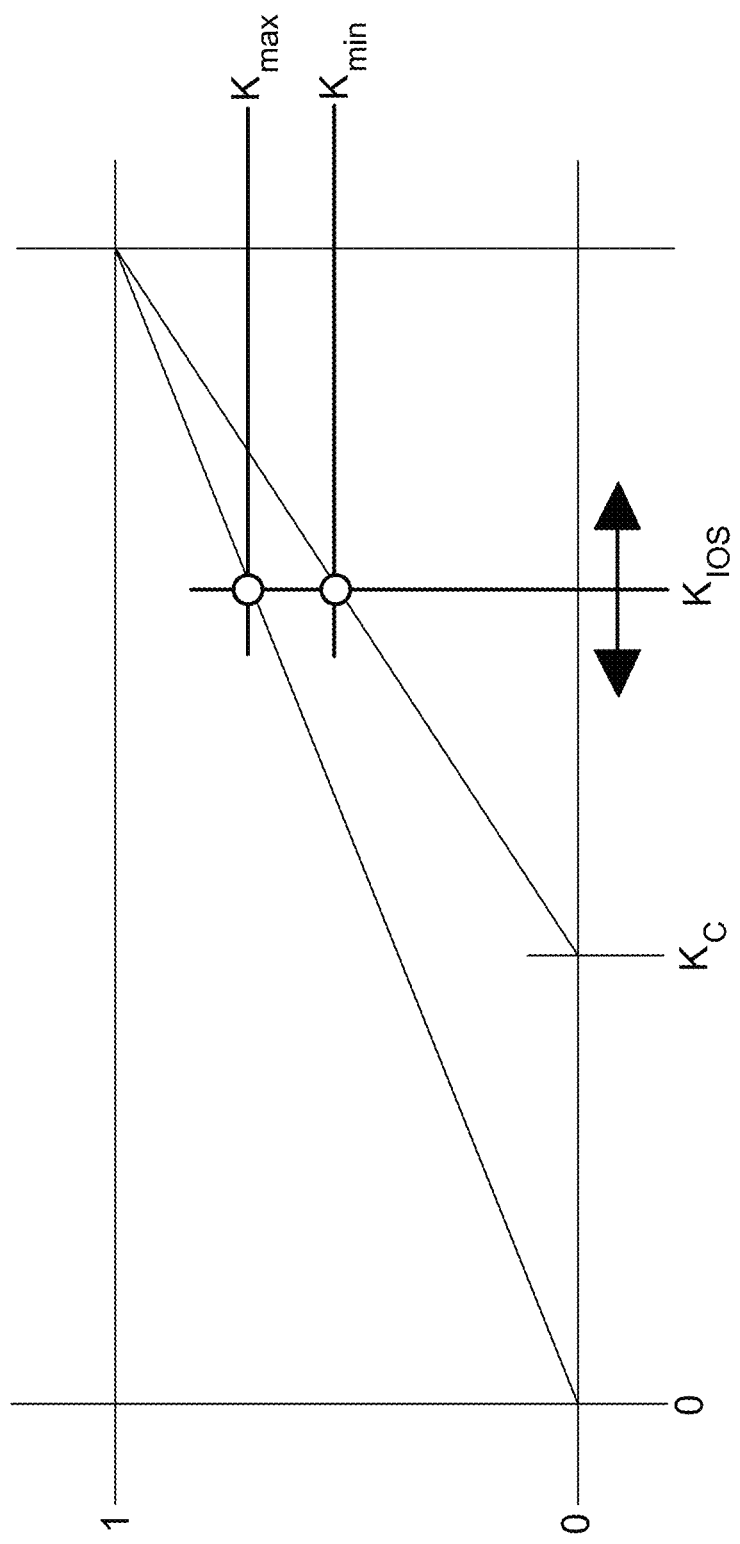
FIG. 5B is a graphical representation of an adaptive scale factor used to determine a damping coefficient as a function of mitigation level set by an instructor.

For determining the adaptive gain coefficient, $K_A$, the terms $K_{min}$ and $K_{max}$ are limits that are determined based upon input provided by the operator. As shown in FIG. 5B, the detection algorithm determines the limits $K_{min}$ and $K_{max}$ that will be employed with the use another constant, $K_C$. The constant $K_C$ defines at what point the introduction of full-time mitigation occurs, regardless of PIO state. Another constant, $K_{IOS}$, is a constant that may be selected by an instructor via an Instructor Operator Station (IOS), as shown by the arrow in FIG. 5B. The value of the term $K_{min}$ is determined by the cross-over between the user selected $K_{IOS}$ constant and the line defined by the constant $K_C$ and one shown in FIG. 5B The value of $K_{max}$ is determined by the cross-over between the user selected $K_{IOS}$ constant and the line between zero and one shown in FIG. 5B. In an embodiment, the constant $K_C$ is tuned for a particular vehicle being simulated to control the relationship between instructor setting ($K_{IOS}$) and the minimum and maximum levels of mitigation possible. That is, it can be set to a given value by the instructor.

Figure 6:
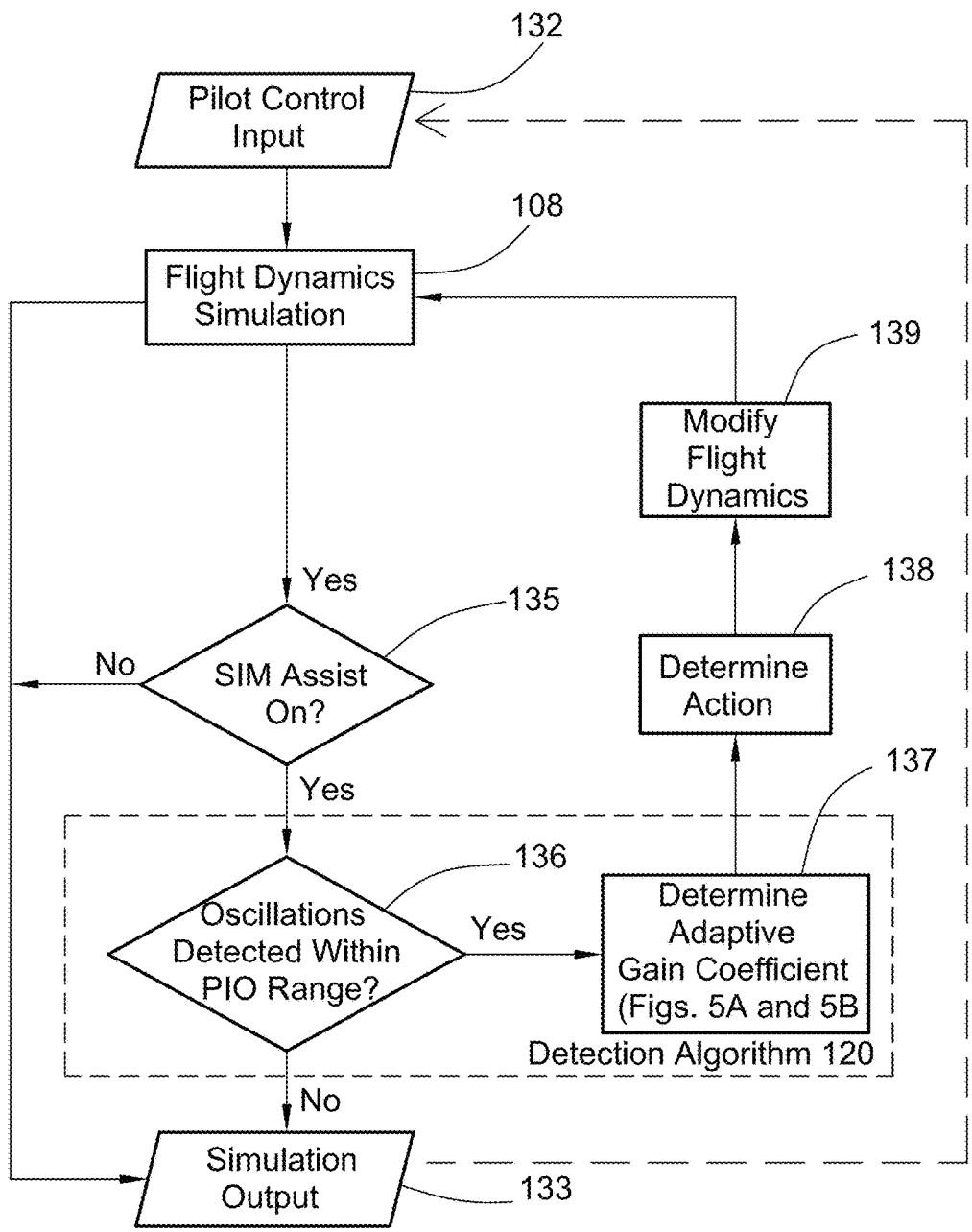
FIG. 6 is a high level flow chart illustrating the operation of a simulation assistance method together with a main flight dynamics simulation process.

The details of operation of the simulation assistance method and system in conjunction with main flight dynamics simulation software or process 108 executing on the simulation computer 94 are shown in FIG. 6. The method begins and continues to a pilot control input block 132 in which pilot control input data are received with respect to the cyclic, collective, and pedal flight controls (such as, for example, the data received on the communication channels 96, 98, 100 and 102 shown in FIG. 3). The flight dynamics simulation process 108 operates in a known manner to provide the simulated dynamics based on a substantially continuous polling of the pilot control input data and the determination of the various equations of motion (EOM) for the simulated dynamics. As explained above, the flight dynamics simulation process 108 also operates in response to various simulation delays which may arise in the simulation. The flight dynamics simulation process 108 also provides simulation output data to, among other things, generate display data, auditory signal data and artificial force data to be applied to the pilot controls as shown by a Simulation Output block 133, and as explained in greater below.

From the simulated dynamics as determined by the flight dynamics simulation process 108, the system then proceeds to a decision block 135 and determines whether the simulation assistance process is activated or "On," as explained in greater below. If the process is inactive, the pilot control output data generated by the flight dynamics simulation process 108 is provided to the Simulation Output block 133 and no further action is taken. Any oscillations may include those within the PIO frequency range for the particular aircraft and the particular axis or axes which may worsen over time by the out-of-phase feedback.

Figure 1:
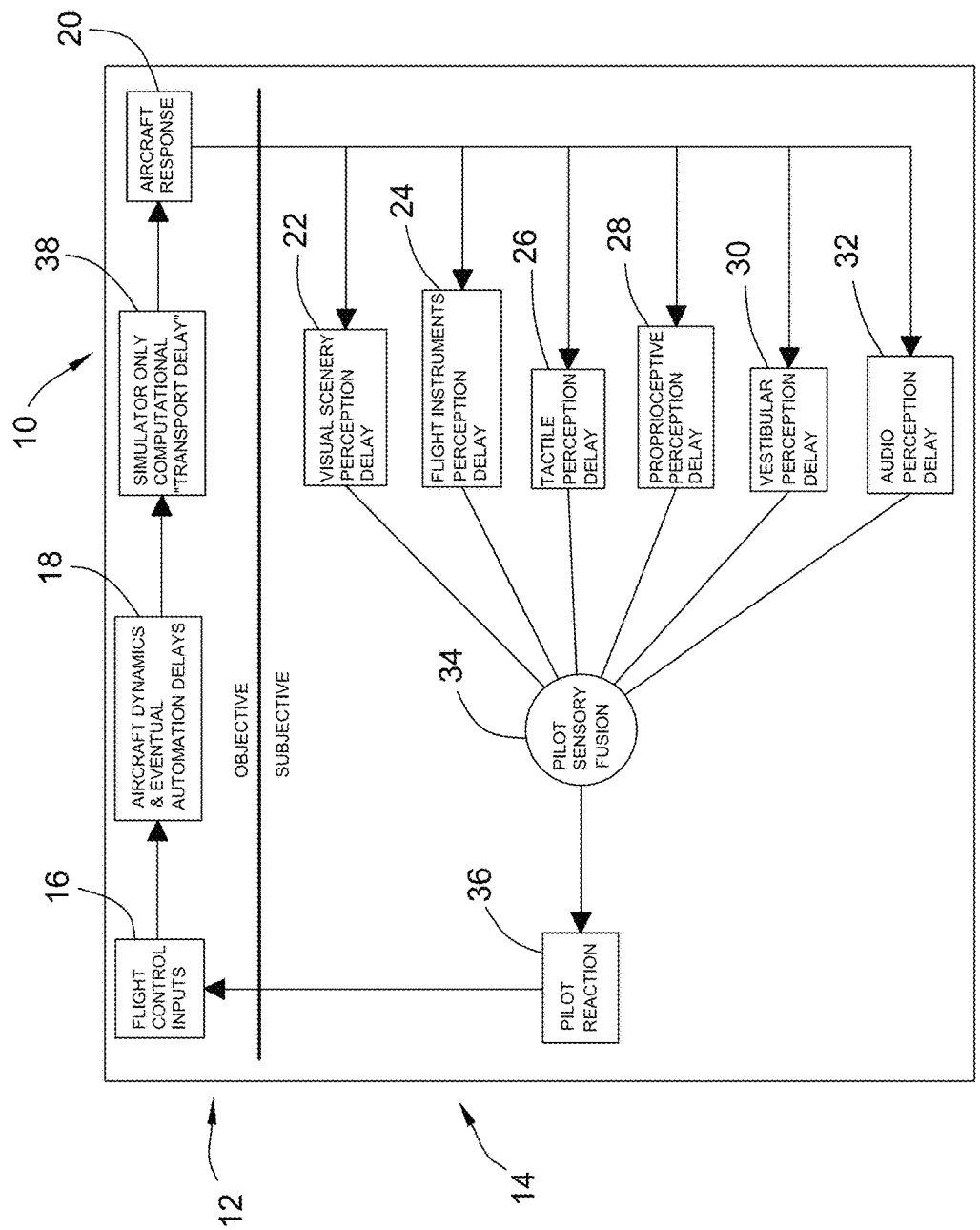
FIG. 1 illustrates a pilot-aircraft control loop in a general sense.

If, on the other hand, the simulation assistance process is activated, the system proceeds to a next decision block 136 and determines whether oscillations are present which fall within the PIO frequency range for the particular aircraft and the particular axis. If not, then the pilot control output data generated by the flight dynamics simulation process 108 is provided to the Simulation Output block 133. However, if such detected oscillations are within the PIO frequency range, the system proceeds to a block 137 and determines an adaptive gain coefficient, $K_A$. As explained below, the system next determines an appropriation action to mitigate the detected PIO oscillations at a block 138. This may optionally include modifying the flight dynamics of simulated aircraft as shown by a block 139, which are then provided to the flight dynamics simulation process 108. In addition, the simulation assistance process may operate to display to the pilot the current assistance level on a cockpit instrument or visual display, provide an auditory signal corresponding to the current assistance level, and/or determine an artificial force to be applied to the pilot controls, as determined at the block 138 and explained in greater detail below. The system then continues. The dashed line from the Simulation Output block 133 to the Pilot Control Input block 132 is not intended to illustrate program logic flow, but instead to indicate closing the loop between flight simulation output an pilot inputs, such as through pilot sensory response and reaction as is shown in FIG. 1.

Once the adaptive gain coefficient $K_A$ has been computed, the simulation assistance system performs PIO mitigation via one or more of several mechanisms. In an embodiment, the instructor can selectively enable or disable one or more of such mechanisms via the IOS, or alternatively, these mechanisms may all be active at the same time.

Figure 7:
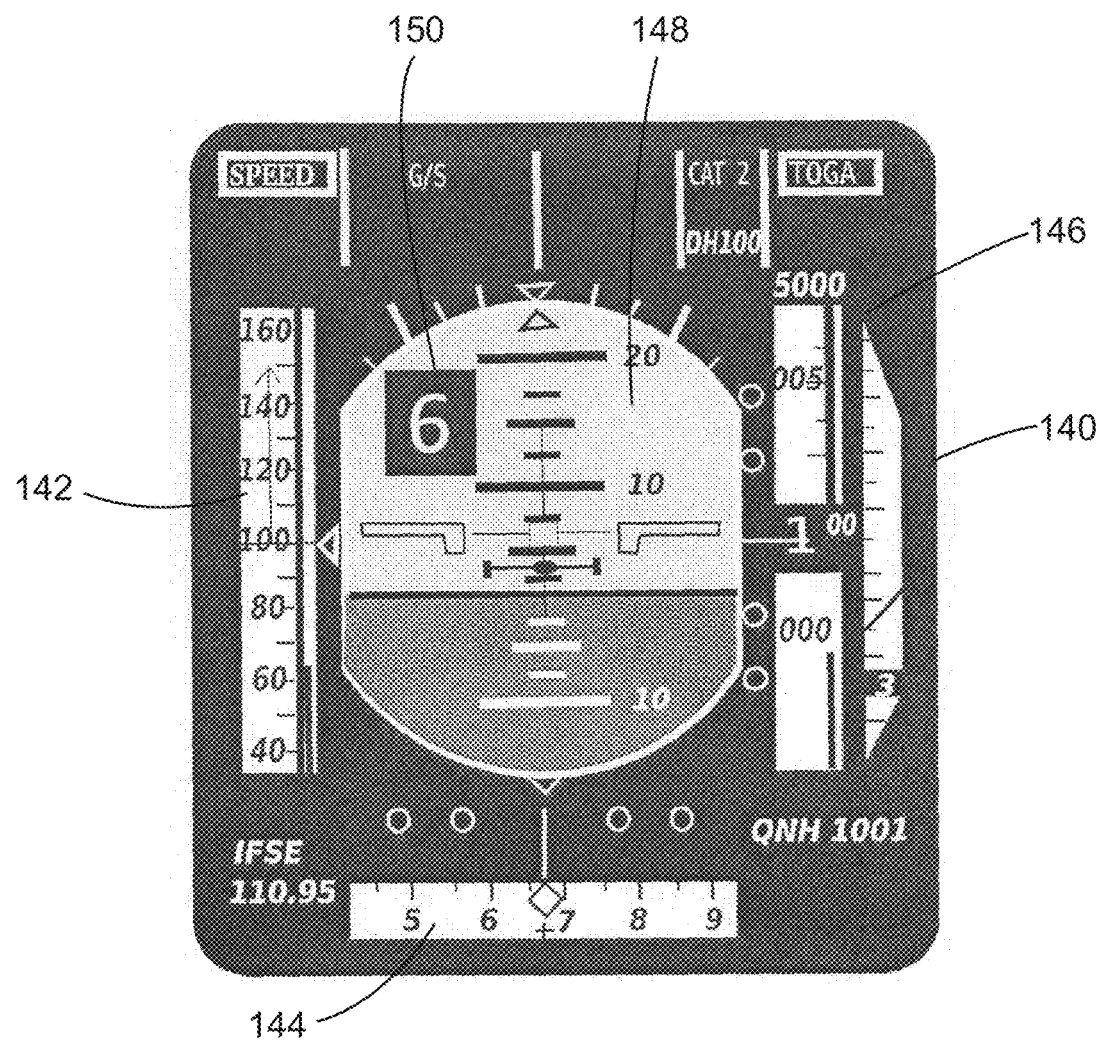
FIG. 7 shows an instrument panel for a flight simulator in which an embodiment of the disclosure is utilized.

For example, PIO mitigation occurs through visual feedback to the pilot and/or the instructor. FIG. 7 illustrates one embodiment in which the simulation assistance system provides such visual feedback. As shown, an electronic flight instrument display 140 includes various known visual indicators, such as an airspeed indicator 142, a heading indicator 144, an altimeter 146, and an attitude direction indicator 148. In this case, the attitude direction indicator 148 includes a display portion 150 in which a numeric value corresponding to the adaptive gain coefficient, of $K_A$, may be selectively displayed. When the simulation assistance system is inactive, the adaptive gain coefficient $K_A$ is null and no numeric value is displayed. On the other hand, when the simulation assistance system is active, the display portion 150 displays a numeral between "1" and "9", such as the "6" shown in the display portion 150. This represents, in tenths, the instantaneous adaptive gain coefficient $K_A$, normalized from zero to 1. In addition, the area of the display portion 150 surrounding the displayed numeral may be colored green for low values (such as "1" to "3"), yellow for medium values (such as "4" to "6"), and red for high values (such as "7" to "9"). Such a linear transition between green and red provides intuitive feedback even in peripheral vision. The pilot may use such information to adapt hand and feet behavior on the flight controls, and the instructor may monitor its current level likewise.

Of course, such visual cues may be provided at alternative locations, such as superimposed on the out-the-window Visual Display System.

Figure 8:
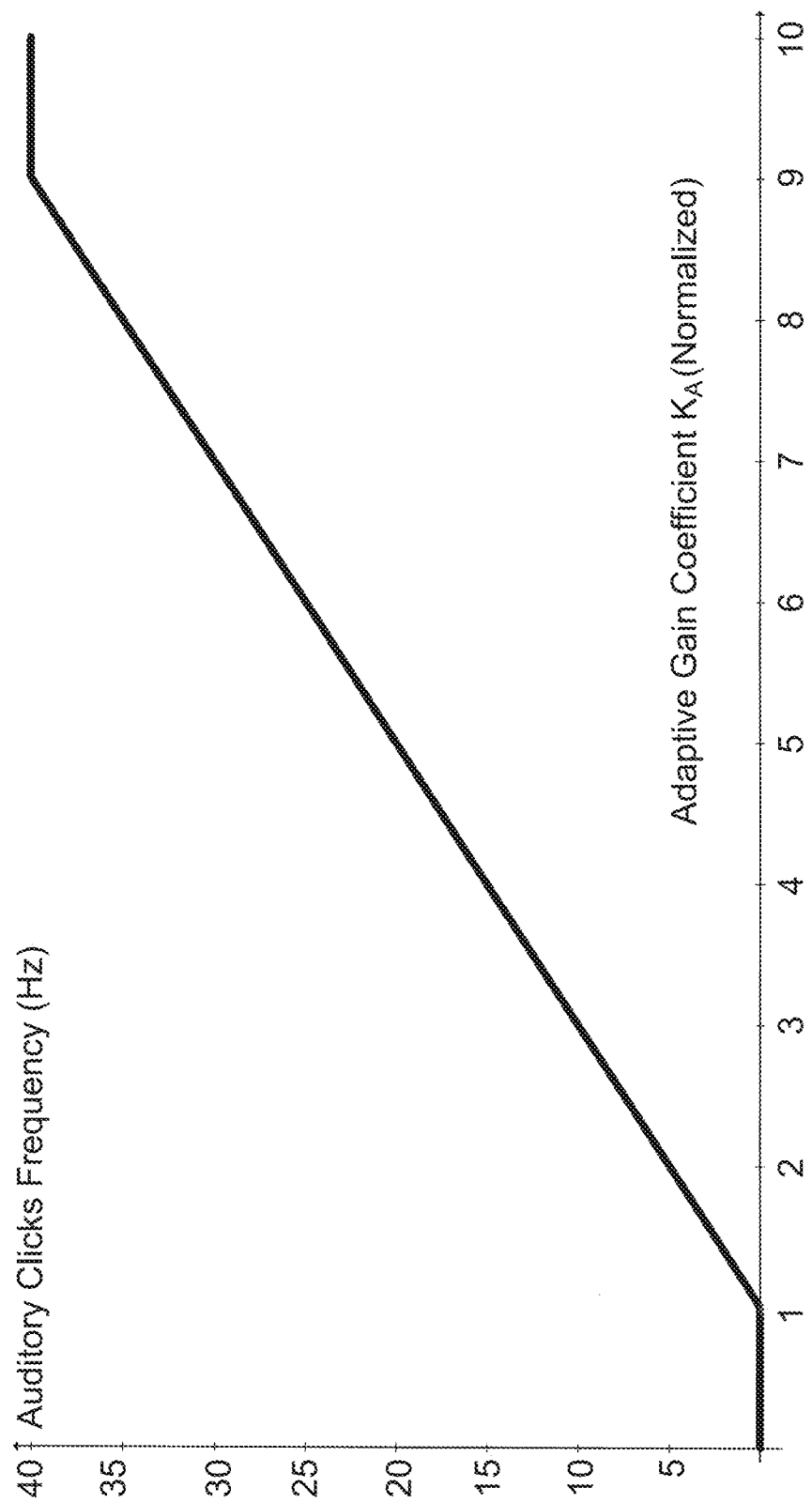
FIG. 8 illustrates the generation of an exemplary auditory warning signal as a function of a determined adaptive gain coefficient according to one embodiment of the disclosure.

Alternatively, or in addition to visual cues, the simulation assistance system may provide the pilot and/or the instructor with auditory feedback. The current value of the instantaneous adaptive gain coefficient $K_A$ may optionally be used to generate a supplemental sound in the pilot and instructor headsets, or as background within the FSTD enclosure. FIG. 8 illustrates an exemplary embodiment illustrating a frequency of auditory clicks as a function of the instantaneous adaptive gain coefficient $K_A$. Specifically, FIG. 8 also illustrates the instantaneous adaptive gain coefficient $K_A$ in units normalized from zero to 1. As shown therein, the generation of a relatively low frequency auditory signal is generated when the amount of adaptive gain is concomitantly low. The frequency of the auditory signal increases linearly as the amount of adaptive gain increases to a maximum value. The auditory signal may be output as a series of auditory clicks through the cockpit loudspeaker or headset. Alternatively, the auditory signal may be provided as a fixed frequency but with its volume increasing as the adaptive gain coefficient $K_A$ increases. In either event, the pilot uses the auditory signal as feedback to adapt his or her flight control behavior.

In another aspect of the disclosure, the simulation assistance system optionally modifies flight dynamics in the simulation by applying vehicle rate damping. This mitigation method, which directly alters dynamic equations determined by the simulation software, cannot be performed in real aircraft deployment of the simulation assistance system. For providing vehicle rate damping, modified pitch, roll, and yaw moments are computed as follows:

$$\Delta M = -K_M (\text{body rate})$$

where:
$\Delta M$=PIO compensation moment for each axis (roll, pitch yaw)
$K_M$=Damping rate gain for each axis
body rate=P, Q, or R angular velocities In this regard, the damping rate gain $K_M$ value is determined as a function of the computed adaptive gain coefficient $K_A$. That is, the damping rate gain $K_M$ value is determined by pilot performance. In a specific implementation, the angular velocity R may be computed for coordinated flight based on bank angle for airspeed greater than 40 knots. The PIO compensation moment $\Delta M$ in each axis is added to the vehicle's existing dynamics while computing the equations of motion (EOM) for the simulation in a manner that will be understood by those skilled in the art.

The simulation software optionally provides mitigation by affecting the flight controls of the pilot. Specifically, a force is applied to each primary flight control axis (roll, pitch, and yaw), acting like a basic stability augmentation system to damp body rates. The control force is computed as follows for each axis:

$$F = K_A (-K_P (\text{body rate}) - K_D (\text{body accel}))$$

where:
$K_P$=Proportional gain for body rate
$K_D$=Proportional gain for body acceleration
body rate=P, Q, or R angular velocities
body accel=Pdot, Qdot, or Rdot angular accelerations In reference to FIG. 3, this force is created by actuators 88, 90 and 92 in response to output signals provided by the simulation computers 94 on the communication channels 96, 98 and 100 respectfully. In this way, such force may be applied as a correcting force on the flight controls of the pilot. It is felt by the student pilot as if the flight instructor was nudging the flight controls in the correct direction, providing tactile feedback to the student during the conduct of the task.

Alternatively, or in addition to applying a correcting force on the flight controls, the simulation software optionally provides mitigation in the form of other tactile feedback via the flight controls. As an example, the simulation computers 94 may provide digital signals to the actuators 88, 90 and 92 via the communication channels 96, 98 and 100 to cause vibration of the flight controls, such as linearly increasing the amount of vibration of the flight controls as a function of the amount of computed adaptive gain coefficient $K_A$ applied to each primary flight control axis (roll, pitch, and yaw).

Figure 9:
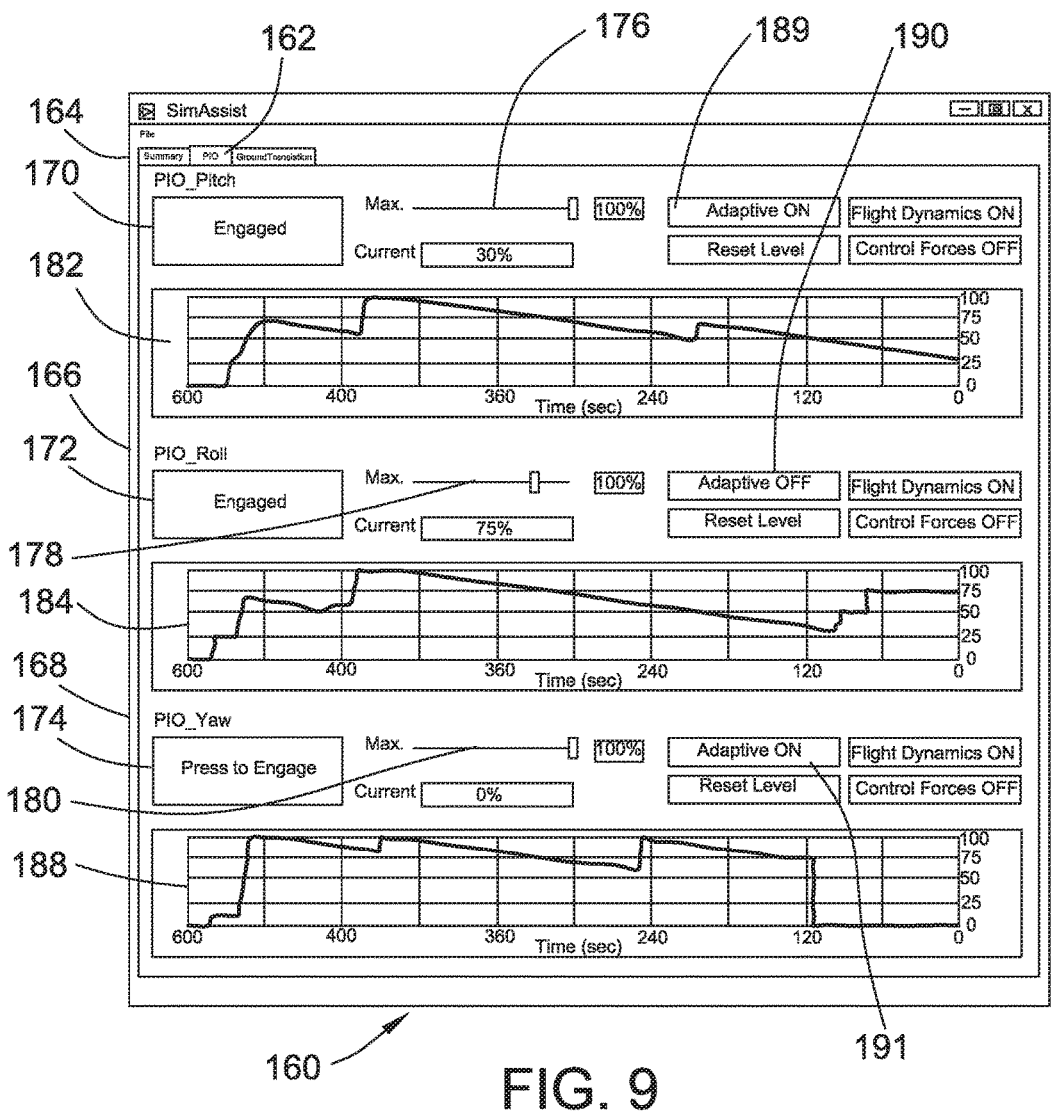
FIG. 9 shows an instructor user interface according to another embodiment of the disclosure.

FIG. 9 illustrates a user interface 160 that is accessible by an instructor through the Instructor Operator Station (IOS). The user interface 160 is presented by selection of a "PIO" tab 162. As shown, the interface 160 provides various instructor control and monitor functions. The interface provides display portions for each rotational axis, including a "PIO_Pitch" display portion 164, a "PIO_Roll" display portion 166, and a "PIO_Yaw" display portion 168. These rotational axes have activation buttons 170, 172 and 174, respectively. Such buttons are used to activate the simulation assistance software with respect to the respective axes. FIG. 9 also illustrates the manner in which the instructor setting ($K_{IOS}$) can be fixed via control sliders 176, 178 and 180, corresponding to the three axes of rotation respectively. In addition, control buttons 189, 190, and 191 may be used to allow the gain coefficient that will be utilized to be adaptive. This provides a further feature of the disclosure.

The respective display portions 164, 166 and 168 also present a strip chart illustrated as a PIO_Pitch strip chart 182, a PIO_strip chart 184 and a PIO_Yaw strip chart 188. Each of the charts 182, 184 and 188 provide the instantaneous gain coefficient as well as historical gain coefficient information as a function of time. In this way, the instructor can monitor both real time and historical gain coefficients for the respective pitch, roll and yaw axes to obtain an understanding of the amount of mitigation applied by the simulation assistance software.

Figure 10:
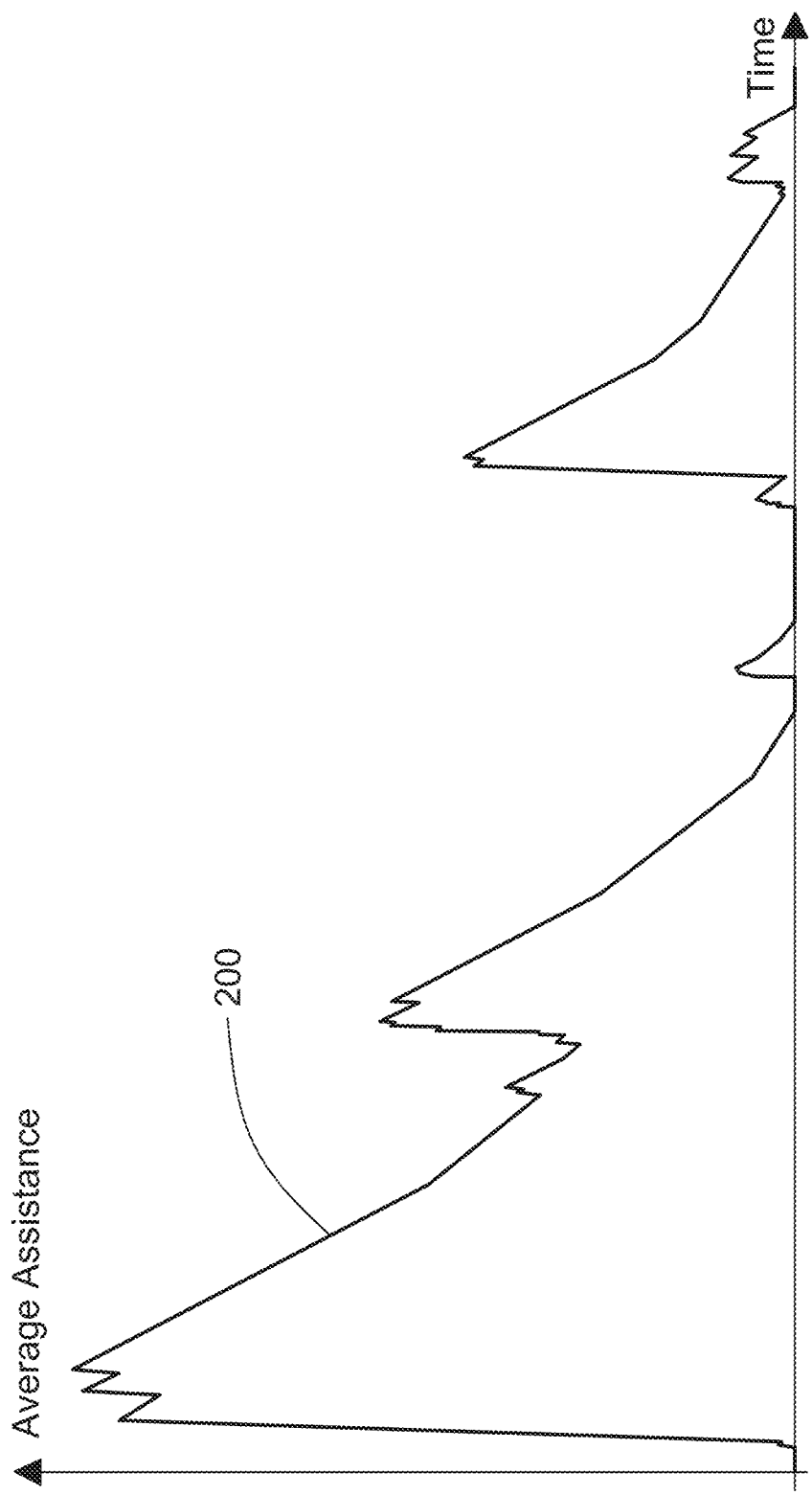
FIG. 10 is a graphical representation of an average assistance provided by the disclosure as a function of time along the pitch, roll, and yaw axes during a static hover task.

FIG. 10 illustrates the adaptive nature of the simulation assistance software according to this disclosure. Specifically, FIG. 10 shows a plot of an average for the adaptive gain coefficients (denoted by the line 200) applied by the simulation software to mitigate PIOs along the pitch, roll, and yaw axes during a static hover task is shown as a function of time. Of course, the particular assistance units and time scale will depend on the particular pilot and the task attempted to be mastered.

In a general sense, however, the need for the adaptive assistance to kick in to help the pilot during a specific task decreases with time, both in amplitude and in frequency. This is due to the fact that, as pilot proficiency is progressively gained, or as adaptation to the simulation environment is achieved, the necessary assistance is triggered less and less frequently and with a lower and lower peak level. When pilot becomes fully proficient, no assistance triggers during the task, indicating that the pilot has mastered that particular task. This eventual disappearance of assistance with proficiency makes the system an "on-demand" training aid having a similar effect as having a flight instructor aboard.

Figure 11:
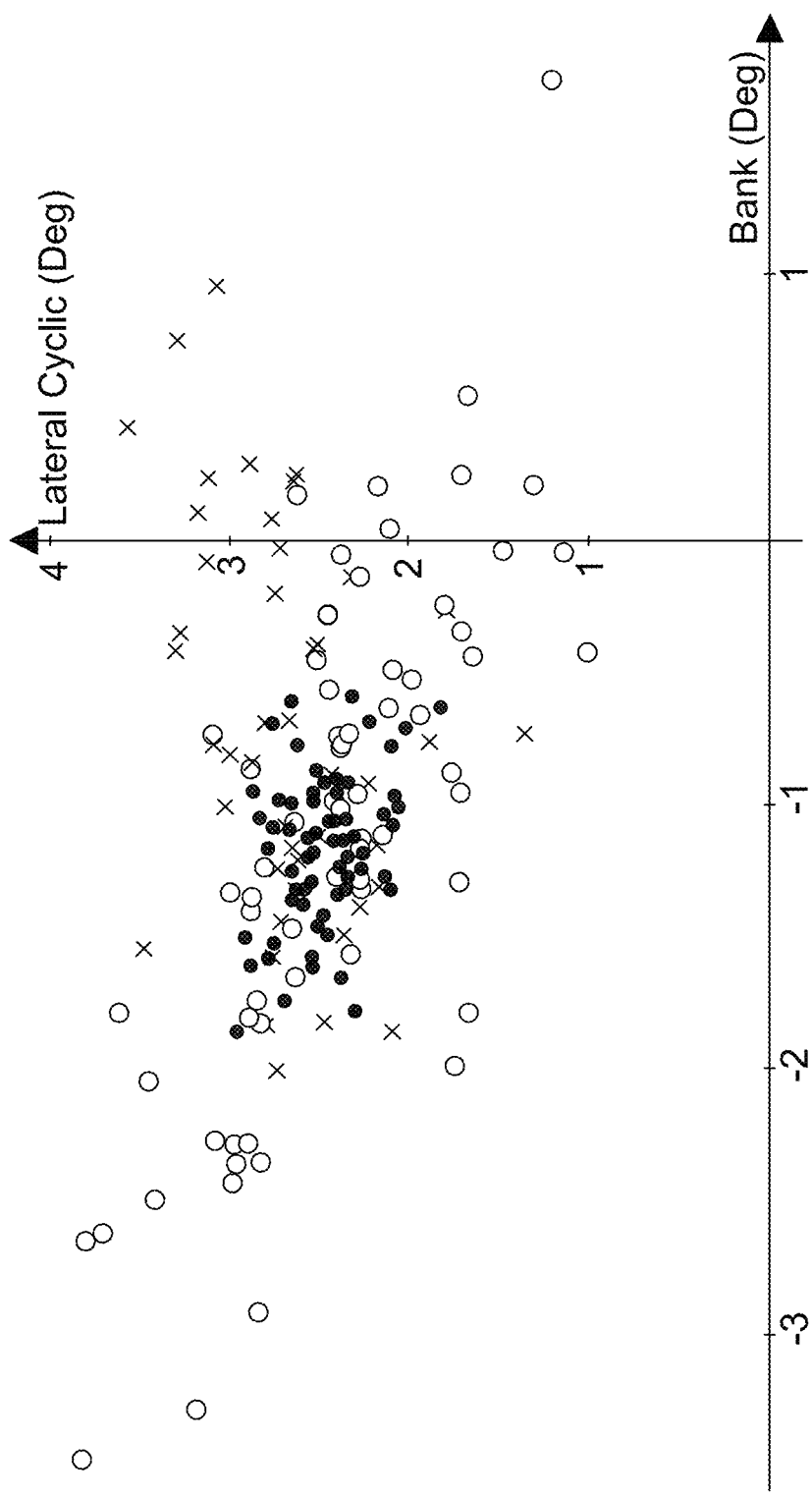
FIG. 11 illustrates a pilot workload during a static hover task showing a calibrated lateral cyclic position in degrees as a function of aircraft bank in degrees.

FIG. 11 illustrates a comparison of actual data points corresponding to a pilot workload collected from a real aircraft (Bell 206 helicopter) and from a FSTD for the same make and model of aircraft, the latter with the simulation assistance software both activated and deactivated. The data point plot illustrates the calibrated lateral position of the cyclic control (in degrees) as a function of aircraft bank (also in degrees) for a particular maneuver, in this case a static hover. Specifically, FIG. 11 shows data points corresponding to cyclic position that were collected from a real aircraft as x-crosses. Data points collected from an FSTD with the simulation assistance software deactivated are shown as open circles. Finally, data points from the FSTD with the simulation assistance software activated are shown as filled-in circles. With the simulation assistance software activated, dispersion of the pilot commands—and consequently of the aircraft response—is less as compared to the data points corresponding to the simulation assistance software being deactivated. Dynamically, this corresponds to less PIO during the simulation. In this way, the simulation assistance system tends to bring pilot behavior in closer alignment with that needed to control the real aircraft.

It will be apparent to an engineer cognizant with flight simulation that the process described above for rotational axes (pitch, bank, yaw) apply in the same manner to translational axes (surge, sway, heave). Some helicopters tend to enter into vertical PIOs (heave axis) if the pilot applies collective inputs out of phase. Some aircraft tend to enter into airspeed PIOs (surge axis) if the pilot mismanages throttle inputs.

While the above description is directed to general-purpose PIO mitigation that may be applied to specific flight simulation tasks, the disclosure is not limited thereto. The disclosure may also be employed in other contexts, such as mastering helicopter autorotation, where a relatively precise set of pilot actions must be conducted so as to lead to a survivable outcome. Upon triggering an event (such as an engine failure) requiring the pilot to enter an autorotation, the simulation assistance software may be modified to perform the following steps. First, the simulation assistance system computes an ideal aircraft state profile, as a function of time, weight, altitude, and other parameters. Next, the simulation assistance system computes, in real-time, desired body rates about three axes of rotation (P, Q, and R) to drive the simulated aircraft toward the ideal state. The system then subtracts the desired body rates from the actual body rates used as inputs into variants of the Flight Dynamics and Flight Controls equations or filters, as explained above.

Indeed, the simulation assistance system may employ such a method with respect to other pilot tasks for which an ideal state profile or trajectory may be computed. That is, the disclosure is not limited to mitigating PIOs or for conducting autorotation maneuvers. By way of example, the assistance system may be used to mitigate such pilot tasks as normal takeoff where prevention of the lift-off transition from reaching extreme attitudes is desired. In addition, the assistance system may be deployed to assist in such maneuvers as rejected takeoff, normal approach and landing, specialized approaches, e.g. Cat A approaches, rejected landing, stall recovery, hover in reference to the deck of a pitching, rolling, and/or heaving ship or vessel. Indeed, the assistance system may be employed in numerous other tasks where a flight parameter needs to be held within some boundaries.

Various advantages flow from this disclosure. For example, the disclosure provides low intrusion and acceptability as it may be deployed as an add-on to normal flight simulation operations. When not activated, the system has no effect on the flight simulator. The instructor may activate the system as desired, allowing it to "kick in" when needed, or disabling it altogether. It is a training aid. The system is adaptive, even without instructor adjustments. If initially the student pilot receives significant assistance, as proficiency develops, it diminishes and finally terminates on its own. It has variable "on-demand" ability. Furthermore, the system can, in a short time, prevent the flight from entering a completely abnormal domain that has no training value for an ab-initio student pilot. An acceptability advantage is that in one embodiment the system essentially simulates the hand of the instructor on the copilot flight controls, nudging them in the right direction, as done in real aircraft with dual controls.

The assistance system according to this disclosure also increases training efficiency and comfort. That is, the assistance system reduces time to proficiency for pilots learning new tasks in flight simulators, especially flight simulators without any motion system. By reducing PIO when needed, the assistance system also reduces the incidence of "simulator sickness", not uncommon among pilots adapting to the reduced set of cues provided by flight simulators.

In addition, the assistance system allows monitoring of student progress. That is, the disclosure provides a training advantage by allowing instructors to measure the progress of a student by monitoring the time decrease of any assistance required to correctly accomplish specific tasks of a curriculum. Completion of a training task may be objectively judged by the system not triggering at all during that task.

The disclosure also provides increased safety. Indeed, the applicability of flight simulators is expanded by allowing maneuvers that are prone to accidents such as hovering and autorotation, which otherwise have to be performed in real aircraft.

As explained above, the simulation assistance system may be implemented as an add-on to normal flight simulation operations. Therefore, when not activated, the assistance system has no effect on the flight simulator. In addition, a flight instructor preferably is provided with final authority on whether to activate the assistance system by activating the system as needed or desired, or disabling it altogether. In this regard, the system provides a training aid that is selectively activated.

Accordingly, a system and method according to the present disclosure has been described that provides a significant tool to augment flight training in a unobtrusive, adaptable, and safe way. While the above description contains particular details, these should not be construed as limitations on the scope of the disclosure, but rather should be considered as embodiments thereof. Other variations are possible, as are briefly presented. It will be apparent to persons skilled in the art, such as those practicing in Aeronautical Control Systems Engineering, that the method for detection of pilot induced oscillations can be altered and yet perform the same function as in the present disclosure. For example, those skilled in the art will appreciate that the presentation of the assistance level provided herein as a digit or a colored box to the pilot can be replaced by other signaling methodologies performing the same functions. Accordingly, the scope of the disclosure should be determined not by the embodiments illustrated, but by the appended claims and equivalents.

What is claimed is:

1. A computer program product for use in an aircraft flight simulation training device, the computer program product comprising a computer readable medium having computer readable program code stored thereon, the computer readable program code including program code for monitoring a simulated aircraft body rate signal with respect to at least one axis of rotation, frequency decompositing the simulated aircraft body rate signal about at least one axis of rotation by band-pass filtering the body rate signal between a low-pass value and a high pass value to provide a filtered body rate signal in a preselected frequency band, calculating a gain coefficient as a function of the amplitude of the filtered body rate signal in which the gain coefficient is adaptive such that it decreases as the pilot progresses in a flight training maneuver, and applying an artificial aircraft body rate damping coefficient based on the calculated gain coefficient to reduce the filtered body rate signal.

2. The invention as in claim 1 wherein the aircraft flight simulation training device simulates movement of a rotary wing aircraft.

3. The invention as in claim 1 wherein the monitoring step includes monitoring a simulated aircraft body rate with respect to pitch, roll, and yaw axes.

4. The invention as in claim 1 wherein the monitoring step includes monitoring a simulated aircraft body rate with respect to surge, sway, and heave axes.

5. The invention as in claim 1 wherein the low and high pass values typically bound the frequency of pilot induced oscillations that are encountered in simulated aircraft.

6. The invention as in claim 1 wherein the gain coefficient is set as a constant value.

7. The invention as in claim 1 wherein indication of the gain coefficient is displayed on a flight instrument panel.

8. The invention as in claim 1 further comprising outputting an audible signal proportional to the gain coefficient.

9. The invention as in claim 1 further comprising outputting a signal based on the gain coefficient to create a nudging force of appropriate amplitude and phase on the flight controls held by the pilot to emulate a corrective action.

10. The invention as in claim 1 wherein the gain coefficient is adaptive such that it decreases as the pilot progresses in a flight training maneuver.

11. A flight training method to reduce pilot induced oscillations during operation of a flight simulator for a rotary wing aircraft, comprising
    monitoring a simulated aircraft body rate signal with respect to at least one axis of rotation,
    frequency decompositing the simulated aircraft body rate signal about the at least one axis of rotation,
    band-pass filtering the body rate signal between a low-pass value and a high pass value to provide a filtered body rate signal in a preselected frequency band,
    calculating a gain coefficient as a function of the amplitude of the filtered body rate signal,
    outputting a human discernable indication of the gain coefficient to a user, and
    applying an artificial aircraft body rate damping coefficient in proportion to the calculated gain coefficient to reduce the filtered body rate signal.

* * * * *